(12) United States Patent
Chelaidite et al.

(10) Patent No.: US 10,184,536 B2
(45) Date of Patent: Jan. 22, 2019

(54) BRAKE PISTON

(71) Applicant: Akebono Brake Industry Co., Ltd., Chuo-ku, Tokyo (JP)

(72) Inventors: Galus Chelaidite, South Lyon, MI (US); Michio Suzuki, Commerce, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 119 days.

(21) Appl. No.: 15/274,270

(22) Filed: Sep. 23, 2016

(65) Prior Publication Data

US 2018/0087590 A1    Mar. 29, 2018

(51) Int. Cl.
| | |
|---|---|
| *F16D 65/18* | (2006.01) |
| *F16D 55/2265* | (2006.01) |
| *F16D 55/226* | (2006.01) |
| *F16D 121/04* | (2012.01) |
| *F16D 121/24* | (2012.01) |
| *F16D 125/06* | (2012.01) |
| *F16D 125/36* | (2012.01) |
| *F16D 125/40* | (2012.01) |

(52) U.S. Cl.
CPC ......... *F16D 65/183* (2013.01); *F16D 55/226* (2013.01); *F16D 2121/04* (2013.01); *F16D 2121/24* (2013.01); *F16D 2125/06* (2013.01); *F16D 2125/36* (2013.01); *F16D 2125/40* (2013.01)

(58) Field of Classification Search
CPC ............. F16D 2125/36; F16D 2125/40; F16D 2125/06; F16D 2121/14; F16D 2121/24; F16D 2121/04; F16D 2123/00; F16D 55/226; F16D 65/18

USPC .... 188/176, 156, 158, 71.2, 157, 72.2, 72.7, 188/72.8, 72.1, 162, 71.3, 163, 106 F, 188/196 F, 71.9, 106 P, 196 D, 153 R, 188/196 B, 71.4, 73.1, 171, 161

See application file for complete search history.

(56) References Cited

U.S. PATENT DOCUMENTS

| | | |
|---|---|---|
| 3,590,964 A | 7/1971 | Krause |
| 3,670,853 A | 6/1972 | Brooks et al. |
| (Continued) | | |

FOREIGN PATENT DOCUMENTS

| | | |
|---|---|---|
| JP | 2003065366 A1 | 3/2003 |
| JP | 2006029467 A | 2/2006 |
| (Continued) | | |

*Primary Examiner* — Robert A. Siconolfi
*Assistant Examiner* — San M Aung
(74) *Attorney, Agent, or Firm* — The Dobrusin Law Firm, P.C.

(57) ABSTRACT

A brake piston assembly including a brake piston; a rotary to linear stage mechanism including a spindle and a nut; and a ball ramp assembly including a nut ramp plate and a piston ramp plate. The brake piston includes a piston pocket. The ball ramp assembly is located at a bottom wall of the piston pocket. The ball ramp assembly engages a side wall of the piston pocket so that the ball ramp assembly is maintained in the piston pocket after the ball ramp assembly is assembled in the piston pocket. Rotation of the spindle causes the nut to axially move until the nut directly contacts the nut ramp plate, and further axial movement of the nut causes the nut to move the ball ramp assembly and the brake piston against an inboard brake pad to create a clamp force.

20 Claims, 5 Drawing Sheets

(56) References Cited

U.S. PATENT DOCUMENTS

| | | | |
|---|---|---|---|
| 3,900,084 A | 8/1975 | Farr | |
| 4,159,754 A | 7/1979 | Airheart et al. | |
| 6,422,354 B1 | 7/2002 | Shaw et al. | |
| 6,988,596 B2 | 1/2006 | Gerard et al. | |
| 7,490,703 B2 | 2/2009 | Maehara | |
| 7,681,961 B2 | 3/2010 | Nonaga et al. | |
| 8,069,961 B2 | 12/2011 | Watada | |
| 8,444,231 B2 | 5/2013 | Ishii | |
| 8,733,513 B2 | 5/2014 | Takahashi et al. | |
| 8,936,137 B2 | 1/2015 | Yoshikawa et al. | |
| 9,086,108 B2 | 7/2015 | Sakashita | |
| 9,333,953 B2 | 5/2016 | Masuda et al. | |
| 9,387,837 B2 | 7/2016 | Yokoyama | |
| 9,434,368 B2 | 9/2016 | Ohara et al. | |
| 9,457,783 B2 | 10/2016 | Kotake et al. | |
| 2003/0042084 A1* | 3/2003 | Kawase | F16D 55/00 188/72.1 |
| 2003/0065366 A1 | 4/2003 | Merritt et al. | |
| 2005/0217949 A1 | 10/2005 | Ohta | |
| 2009/0014257 A1 | 1/2009 | Watada | |
| 2009/0095580 A1* | 4/2009 | Baier-Welt | F16D 65/18 188/72.8 |
| 2010/0163351 A1 | 7/2010 | Sakashita et al. | |
| 2011/0315492 A1 | 12/2011 | Sakashita | |
| 2012/0193177 A1* | 8/2012 | Goto | B60T 13/741 188/161 |
| 2012/0292141 A1* | 11/2012 | Takahashi | F16D 65/18 188/72.3 |
| 2013/0075205 A1 | 3/2013 | Sakashita et al. | |
| 2014/0000992 A1 | 1/2014 | Tajima et al. | |
| 2014/0034430 A1 | 2/2014 | Fuse et al. | |
| 2014/0069750 A1 | 3/2014 | Nohira et al. | |
| 2014/0090933 A1 | 4/2014 | Sakashita et al. | |
| 2015/0061365 A1 | 3/2015 | Sakashita et al. | |
| 2015/0203079 A1 | 7/2015 | Sekiguchi et al. | |
| 2015/0274139 A1 | 10/2015 | Okada et al. | |
| 2015/0323026 A1* | 11/2015 | Yasui | F16D 65/18 188/72.7 |
| 2016/0032994 A1* | 2/2016 | Sakashita | F16D 55/225 188/72.3 |

FOREIGN PATENT DOCUMENTS

| | | |
|---|---|---|
| JP | 2006118686 A | 5/2006 |
| JP | 2006183820 A | 7/2006 |
| JP | 2006189148 A | 7/2006 |
| JP | 2006213323 A | 8/2006 |
| JP | 2006250325 A | 9/2006 |
| JP | 2006266346 A | 10/2006 |
| JP | 2006283887 A | 10/2006 |
| JP | 2007008198 A | 1/2007 |
| JP | 2007085536 A | 4/2007 |
| JP | 2007085538 A | 4/2007 |
| JP | 2007100742 A | 4/2007 |
| JP | 2007146957 A | 6/2007 |
| JP | 2007203821 A | 8/2007 |
| JP | 2007298115 A | 11/2007 |
| JP | 2007303679 A | 11/2007 |
| JP | 2008133922 A | 6/2008 |
| JP | 2008169952 A | 7/2008 |
| JP | 2008207679 A | 9/2008 |
| JP | 2008224045 A | 9/2008 |
| JP | 2008281045 A | 11/2008 |
| JP | 2009024794 A | 2/2009 |
| JP | 2009024795 A | 2/2009 |
| JP | 2009036332 A | 2/2009 |
| JP | 2009041581 A | 2/2009 |
| JP | 2009073475 A | 4/2009 |
| JP | 2009162289 A | 7/2009 |
| JP | 2009264478 A | 11/2009 |
| JP | 4409717 B2 | 2/2010 |
| JP | 2010054038 A | 3/2010 |
| JP | 2010169248 A | 8/2010 |
| JP | 2010190348 A | 9/2010 |
| JP | 2010230089 A | 10/2010 |
| JP | 2010249314 A | 11/2010 |
| JP | 2010269795 A | 12/2010 |
| JP | 2011074946 A | 4/2011 |
| JP | 2011094755 A | 5/2011 |
| JP | 4711562 B2 | 6/2011 |
| JP | 2011137482 A | 7/2011 |
| JP | 201163427 A | 8/2011 |
| JP | 2011158058 A | 8/2011 |
| JP | 2011174604 A | 9/2011 |
| JP | 2011202696 A | 10/2011 |
| JP | 2011236984 A | 11/2011 |
| JP | 2012006440 A | 1/2012 |
| JP | 2012007632 A | 1/2012 |
| JP | 2012007674 A | 1/2012 |
| JP | 2012029798 A | 2/2012 |
| JP | 2012041995 A | 3/2012 |
| JP | 2012077809 A | 4/2012 |
| JP | 2012193802 A | 10/2012 |
| JP | 2012193805 A | 10/2012 |
| JP | 2012229798 A | 11/2012 |
| JP | 2012240632 A | 12/2012 |
| JP | 5130243 B2 | 1/2013 |
| JP | 2013011360 A | 1/2013 |
| JP | 2013071642 A | 4/2013 |
| JP | 2013071643 A | 4/2013 |
| JP | 2013072511 A | 4/2013 |
| JP | 2013112167 A | 6/2013 |
| JP | 5252156 B2 | 7/2013 |
| JP | 2013132935 A | 7/2013 |
| JP | 2014029193 A | 2/2014 |
| JP | 2014040902 A | 3/2014 |
| JP | 201470670 A | 4/2014 |
| JP | 2014066281 A | 4/2014 |
| JP | 2014077521 A | 5/2014 |
| JP | 2014092165 A | 5/2014 |
| JP | 2014108655 A | 6/2014 |
| JP | 2014119060 A | 6/2014 |
| JP | 2014122648 A | 7/2014 |
| JP | 2014129003 A | 7/2014 |
| JP | 2014134215 A | 7/2014 |
| JP | 2014190347 A | 10/2014 |
| JP | 2014214830 A | 11/2014 |
| JP | 5633797 B2 | 12/2014 |
| JP | 2014234845 A | 12/2014 |
| JP | 2015009669 A | 1/2015 |
| JP | 2015047945 A | 3/2015 |
| JP | 2015047948 A | 3/2015 |
| JP | 2015068432 A | 4/2015 |
| JP | 2015085869 A | 5/2015 |
| JP | 2015160607 A | 9/2015 |
| JP | 2015189373 A | 11/2015 |
| JP | 2015194165 A | 11/2015 |
| JP | 2015194211 A | 11/2015 |
| JP | 2015196424 A | 11/2015 |

* cited by examiner

BRAKE PISTON

FIELD

These teachings relate to an improved brake piston assembly that includes a ball ramp assembly for creating a clamp force during application of a parking brake.

BACKGROUND

During a standard brake apply in a disc brake system, fluid is pressurized, which causes one or more brake pistons to move one or more brake pads against a brake rotor to create a clamp force. The clamp force functions to decelerate or restrict movement of the vehicle. To release the brake apply and/or to release the clamp force, the fluid is depressurized and, accordingly, the one or more brake pistons and brake pads move away from the brake rotor. Once released, the vehicle is free to move again.

A parking brake system may utilize one or more components of the brake system to maintain a vehicle in a stopped or parked position. In modern applications, parking brake systems may be electromechanical systems. An exemplary electromechanical parking brake system includes a motor gear unit adapted to move one or more brake pistons and brake pads against a brake rotor to create a clamp force to maintain the vehicle in a stopped or parked position. To release the clamp force, the motor gear unit moves the one or more brake pistons away from the one or more brake pads. Opportunities exist for improving in such parking brake systems.

SUMMARY

A brake piston assembly including a brake piston; a rotary to linear stage mechanism including a spindle and a nut; and a ball ramp assembly including a nut ramp plate and a piston ramp plate. The brake piston includes a piston pocket. The ball ramp assembly is located at a bottom wall of the piston pocket. The ball ramp assembly engages a side wall of the piston pocket so that the ball ramp assembly is maintained in the piston pocket after the ball ramp assembly is assembled in the piston pocket. Rotation of the spindle causes the nut to axially move until the nut directly contacts the nut ramp plate, and further axial movement of the nut causes the nut to move the ball ramp assembly and the brake piston against an inboard brake pad to create a clamp force.

A brake system comprising a brake caliper. The brake caliper includes a brake piston assembly located in a caliper bore; a motor gear unit in communication with the spindle; and an inboard brake pad. The brake piston assembly comprising a brake piston; a rotary to linear stage mechanism comprising a spindle and a nut; and a ball ramp assembly comprising a nut ramp plate and a piston ramp plate. The ball ramp assembly is located at a bottom wall of a piston pocket of the brake piston. The nut ramp plate comprises a clutch that engages a side wall of the piston pocket. During a parking brake apply, the motor gear unit rotates the spindle, which causes the nut to axially advance until the nut directly contacts the nut ramp plate, and further rotation of the spindle causes the nut to move the ball ramp assembly and the brake piston against the inboard brake pad and the inboard brake pad against a brake rotor to create a clamp force. The clamp force is created during application of a parking brake.

A brake piston assembly, comprising: a brake piston comprising a piston pocket; a rotary to linear stage mechanism comprising a spindle and a nut; and a ball ramp assembly comprising a nut ramp plate, a piston ramp plate, and a spring. The nut includes a rubber clutch that engages the piston pocket, the clutch restricts rotation of the nut about an axis when the spindle is rotated, the spindle is rotated to create a clamp force. The engagement of the nut and the piston pocket slips as the clamp force increases so that the nut rotates about the axis which causes the nut ramp plate to also rotate about the axis which causes the nut ramp plate and the piston ramp plate to separate. Separation of the nut ramp plate and the piston ramp plate causes the brake piston to move which moves the inboard brake pad to increase the clamp force. The spring is maintained in compression during the increase in the clamp force and also during release of the clamp force.

A method of assembling a brake piston assembly is provided. The method comprising steps of inserting a ball ramp assembly into a piston pocket of a brake piston; and connecting the rotary to linear stage to the ball ramp assembly. The ball ramp assembly comprises a piston ramp plate and a nut ramp plate, and after ball ramp assembly is inserted into the piston pocket, the nut ramp plate includes a clutch that engages a side wall of the piston pocket so that the ball ramp assembly is maintained in the piston pocket.

DETAILED DESCRIPTION

Figure 1:
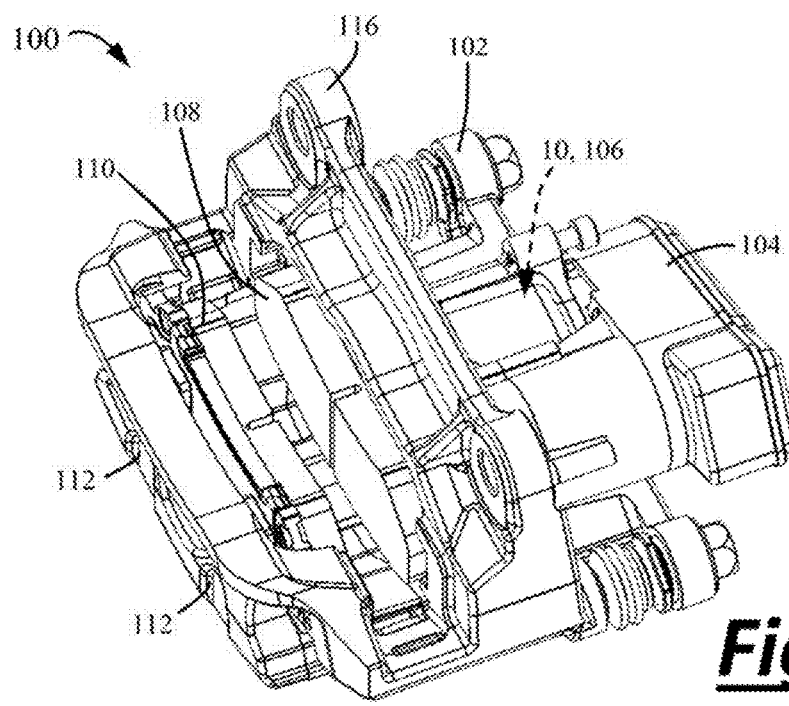
FIG. 1 is a perspective view of a brake caliper.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Brake system. The teachings herein provide a brake system. These teachings may be used in non-vehicular applications. For example, the teachings herein may be applied to brake systems for various machines such as a lathe, a winder for paper products or cloth, amusement park rides, wind turbines, or the like. The teachings herein may also be used in vehicular applications. For example, the teachings herein may be used to create a clamp force to slow, stop, and/or maintain a vehicle in a stopped or parked position. The brake system may be any type of vehicular brake system. For example, the brake system may be an opposing brake system (i.e., a fixed caliper brake system) or a floating brake system (i.e., a floating caliper). The brake system may be the service brake. The brake system may generally include a brake rotor and a brake caliper supporting one or more brake piston assemblies and one or more brake pads.

Parking brake system. A parking brake system may be added to or integrated with the brake system. The parking brake system may function to create a clamp force to maintain a vehicle in a stopped or parked position. The parking brake system may utilize one or more components of the brake system to create the clamp force. For example, during application of the parking brake, the parking brake system may move the one or more brake pistons so that the one or more brake pads are moved against the brake rotor to create the clamp force. The parking brake system may move the one or more brake pistons and thus the one or more brake pads away from the brake rotor to release the clamp force. The parking brake system may generally include a motor gear unit (MGU); one or more rotary to linear stage mechanisms; a ball ramp assembly, or a combination thereof.

Clamp/clamping force. For the sake of clarity, the clamp force as used throughout this disclosure may be any force that is applied in a generally perpendicular direction to a brake pad or rotor plate face that, when coupled with a brake pad coefficient of friction, functions to decelerate, slow, stop, and/or prevent movement or rotation of a brake rotor and/or vehicle. The clamp force may be created during a standard brake apply with the service brake (i.e., a brake apply force), and may also be referred to as a brake force. The clamp force may be created during a parking brake apply (i.e., a parking brake force), and may also be referred to as a parking brake force.

Brake rotor. The brake rotor may cooperate with one or more components of the brake system, one or more components of the parking brake system, or both to create the clamp force. The brake rotor may include an inboard side and an opposing outboard side. One or more brake pads may be located at the inboard side of the brake rotor (i.e., inboard brake pads), one or more brake pads at the outboard side of the brake rotor (i.e., outboard brake pads), or both. When a vehicle is in motion, the brake rotor may rotate with a wheel about an axle of a vehicle. To create the clamp force during either a standard brake apply or during a parking brake apply, the friction material of one or more brake pads can be pushed, moved or pushed against at least one of the sides of the brake rotor. When the brake pads contact the brake rotor and the clamp force is created, a corresponding tangential force equal to the clamp force multiplied by the coefficient of friction of the brake pads is also created. The torque decelerating the vehicle is equal to the tangential force multiplied by the brake radius which is measured between the piston axis and the wheel axis. The tangential force acts to move the brake pads tangentially in a direction of rotation of the brake rotor, however, the support bracket, which supports the brake pads and is connected to a stationary portion of the vehicle, such as a knuckle, opposes the tangential force and restricts the brake pads from moving in the direction of rotation of the brake rotor. The friction material of the one or more brake pads can be moved away from the brake rotor to release the clamp force. After the clamp force has been released, the brake rotor and the vehicle may be once again moved.

Brake pads. One or more brake pads may be used to create the clamp force. When clamp force is created and the one or more brake pads frictionally engage the brake rotor, the process of converting the kinetic energy of the vehicle into thermal energy begins. The one or more brake pads may include one or more features (i.e. ears, projections, etc.) that may engage or be engaged by a brake caliper, a support bracket, or both to maintain the tangential location of the brake pads within the brake system and prevent the brake pads from rotating with the brake rotor when the clamp force is created. In other words, the support bracket maintains the brake pads rotationally stationary relative to the brake rotor.

The one or more brake pads may include a friction material and a pressure plate. The one or more brake pads may be supported on the brake caliper so that the friction material faces a side of the brake rotor. One or more brake pistons or one or more brake caliper fingers may be in selective contact with the pressure plate of a corresponding brake pad. For example, in some cases, one or more brake pistons may be in contact with the pressure plate of an inboard brake pad, and one or more brake caliper fingers may be in contact with the pressure plate of an outboard brake pad, or vice versa. In some cases, one or more brake pistons may be in contact with the pressure place of an inboard brake pad, and one or more brake pistons may be in contact with the pressure place of an outboard brake piston. During a brake apply, or while applying the parking brake, the one or more brake pistons and/or the one or more fingers can move all or an end of a corresponding brake pad so that the corresponding friction material engages a corresponding side of the brake rotor to create the clamp force.

Brake caliper. The brake caliper may function to support one or more the components of the brake system, one or more the components of the parking brake system, or both. For example, the brake caliper may include one or more supports configured to engage and/or support the one or more brake pads. The brake caliper may provide for one or more brake pads, or, preferably, two or more brake pads to move axially relative to the brake rotor. The brake caliper may axially move during a brake apply (i.e., a floating caliper), or the brake caliper may be fixed so that the brake caliper does not move during a brake apply (i.e., a fixed caliper). The brake caliper may be connected to any non-rotating or moving part of a vehicle, like a support or a knuckle.

Caliper Bore. The brake caliper may include one or more caliper bores. Each caliper bore may define a cavity or hollow region in the brake caliper that is configured to receive and support a corresponding brake piston assembly. Some brake calipers may have two or more caliper bores, and such brake calipers have two or more brake piston assemblies. The one or more caliper bores can be located on only one side of the brake rotor, or on both sides of the brake rotor. A brake piston assembly that is supported within a caliper bore may be moved along a caliper bore axis, a longitudinal axis, or both to create or release the clamp force. The caliper bore axis is generally perpendicular to the sides or faces of the brake rotor that the brake pads come into contact with to create the clamp force.

Brake piston assembly. The one or more brake piston assemblies may function to move a corresponding brake pad, or a corresponding end of brake pad, towards the brake rotor to create the clamp force. The one or more brake piston assemblies may be moved away from a brake pad to release the clamp force. The one or more brake piston assemblies may include one or more of the following elements: a brake piston, a rotary to linear stage mechanism, a ball ramp assembly, a thrust bearing, or a combination thereof.

Brake piston. During a brake apply to create a clamp force to decelerate or stop a moving vehicle, one or more brake pistons may be moved by pressurizing a fluid, such as brake fluid. To release the clamp force or the brake apply, the brake piston can be moved away from a brake pad by depressurizing the fluid. During a parking brake apply, to create the clamp force to maintain the vehicle in a stopped or parked position, the brake piston may be moved by moving a corresponding component of the parking brake system, such as one or more rotary to linear stage mechanisms. To release the clamp force or the parking brake, the brake piston can be moved away from the brake pad by moving one or more components of the parking brake system, such as one or more rotary to linear stage mechanisms in an opposing or release direction. During a parking brake apply, a standard brake apply, release of a parking brake, or release of a standard brake apply, the brake piston may be moved along a brake piston axis, which may be collinear or essentially collinear with a caliper bore axis, a longitudinal axis, or both.

Piston pocket. Each brake piston may include an open end defining an opening into a piston pocket. The brake piston is generally cylindrically shaped, open on one end, similar to a cup. The piston pocket may function to receive at least a portion of the parking brake system, such as a rotary to linear stage mechanism, a ball ramp assembly, or both. The piston pocket may be a cup or recess formed into an end of a brake piston. The piston pocket may include a bottom wall at the end or at a bottom of the piston pocket. The bottom wall may be generally perpendicular to the brake piston axis; generally parallel to a side of a brake rotor; or both. In some instances, a gap may exist or may be defined between the bottom wall and the ball ramp assembly, the piston ramp plate, or both. In these instances, the gap between the bottom wall and the ball ramp assembly, the piston ramp plate, or both must be taken up before the clamp force can be created or increased. In other instances, the piston ramp plate may be attached to the bottom wall of the piston pocket. In some of these other instances, the piston ramp plate may be attached to the bottom wall of the piston pocket and may be restricted from rotating or otherwise moving relative to the brake piston. In some instances, the piston ramp plate may be restricted or prevented from axial movement via a clutch on the piston ramp plate that frictionally engages the inner wall of the piston pocket and/or the one or more projections and thus restricted or prevents movement of the piston ramp plate. In some of these other instances, the piston ramp plate may be rotatably attached to the bottom wall of the piston pocket. In some of these other instances, the piston ramp plate may be integrally formed with the bottom wall of the piston pocket. That is, the one or more ramps of the piston ramp plate may be defined or formed in the bottom wall of the piston pocket.

Inner wall of piston pocket. The piston pocket may include an inner cylindrical wall that, together with the bottom wall, defines the piston pocket. The inner wall may be generally perpendicular to the bottom wall. The inner wall may be substantially smooth. The inner wall may have features such as a notch or cutout configured to maintain a stopper or spring in a particular location so that a preload or force can be applied to the ball ramp assembly (e.g., FIG. 2). The inner wall may include one or more projections. The one or more projections may project or extend at least partially along an entire length or depth of the piston pocket, for example from the opening of the piston pocket to the bottom wall of the piston pocket. The inner wall and/or the one or more projections may be engaged by a clutch on the nut, a clutch on the piston ramp plate, or both to selectively restrict rotation of the nut, the piston ramp plate, or both about the longitudinal axis. That is, the clutch on the nut, the clutch on the piston ramp plate, or both may slip when a sufficient torque is applied to the nut and/or piston ramp plate so that the respective nut or piston ramp plate rotates. The piston pocket, the one or more projections, and/or the inner wall may be of the type disclosed in commonly owned U.S. Patent Application No. 62/263,198 filed on Dec. 5, 2015, which is hereby incorporated by reference herein for all purposes.

Piston seal. A piston seal may be located between an outer surface of the brake piston and a corresponding caliper bore. The piston seal may be located in a groove defined in the brake caliper or piston bore. The piston seal may support the brake piston within the caliper bore. An interference fit may be formed between the outer surface of the brake piston and the piston seal so that leakage of brake fluid can be prevented. The piston seal may restrict or prevent the brake piston from rotating about the brake piston axis. That is, the torque due to the frictional engagement between the piston seal and the outer surface of a corresponding brake piston may be greater than the torque of the frictional engagement between the motor gear unit, the spindle, and the nut so that the brake piston does not rotate within the piston seal.

Motor gear unit. The parking brake system may include a motor gear unit (MGU). The MGU may function to create or generate a force or torque, and then transfer the force or torque to one or more components of the parking brake system to create, increase, decrease, and/or release the clamp force. During application of the parking brake to create a clamp force, the MGU may function to generate torque sufficient to move the one or more rotary to linear stage mechanisms, the one or more brake pistons, the one or more brake pads, or a combination thereof toward the brake rotor to create drag with the one or more brake pads against the brake rotor, which acts to prevent the brake rotor and thus vehicle wheel rotation. During release of the parking brake and/or release the clamp force, the MGU may function to generate torque that is sufficient to move the one or more rotary to linear stage mechanisms, the one or more brake pistons, or both away from the one or more brake pads so that the brake pads move away from the brake rotor so that the drag is reduced or eliminated. The MGU may be any device or combination of devices that may perform one or more of the aforementioned functions. For example, the MGU may include a motor that generates torque. For example, the motor may be a DC motor, a brushless motor, a series wound motor, a shunt wound motor, a compound wound motor, a separately exited motor, a servomotor, a stepping motor, or a permanent magnet motor. The MGU may include one or more gears or gear trains that may function to transfer, increase, and/or decrease the torque output of the motor. The MGU may or may not include a lock or brake to prevent back driving of the one or more rotary to linear stage mechanisms after the clamp force is created and after the MGU is turned OFF or disconnected. For example, the MGU may include a wrap spring, solenoid, or other mechanism to maintain the clamp force after the MGU is turned OFF or is disconnected.

Rotary to linear stage mechanism. The parking brake system may include one or more rotary to linear stage mechanisms. The one or more rotary to linear stage mechanisms may function to transfer a power output from the MGU into a linear or axial force to move the one or more brake pistons along a corresponding piston bore axis. The one or more rotary to linear stage mechanisms may be a high-efficiency device such as a ball screw or a roller screw, for example. The one or more rotary to linear stage mechanisms may be a low-efficiency device. The one or more rotary to linear stage mechanisms may be of the type disclosed in commonly owned U.S. provisional patent application No. 62/336,957 filed on May 16, 2016, which is hereby incorporated by reference for all purposes. The one or more rotary to linear stage mechanisms may include a spindle and a nut.

Spindle. The spindle may be rotated by the MGU, and may function to cause the nut to move axially along an axis, which may be the caliper bore axis, the brake piston axis, a spindle axis, a longitudinal axis, or a combination thereof. The spindle may include a threaded portion that threadably engages a threaded portion on the nut.

Nut. Movement of a nut may result in movement of the ball ramp assembly, a nut ramp plate, a piston ramp plate, a brake piston, a brake pad, or a combination thereof. The movement of the nut may be axial, rotational, or both. The movement may be along or about a caliper bore axis, brake piston axis, a spindle axis, a longitudinal axis, or a combination thereof. The nut may be moved by the spindle. For example, the nut and the spindle may be threadably engaged such that when the spindle is rotated by the MGU, the nut moves axially toward or away from the ball ramp mechanism.

When the spindle is rotated by the MGU, the nut may move axially along the longitudinal axis while being restricted from rotating about the axis by the clutch on the nut that engages the inner cylindrical wall of the piston pocket, the one or more projections in the piston pocket, or both. During application of the parking brake, the spindle is rotated, which causes the nut to move axially until the nut contacts and frictionally engages the nut ramp plate such that the spindle, the nut, and the nut ramp plate lock together and rotate together as a single unit with respect to the piston; that is, the clutch on the nut slips with respect to the inner pocket wall thus allowing the nut to rotate with the spindle and the nut ramp plate with respect to the brake piston. The nut may be restricted from rotating about the axis during initial application of the parking brake assembly when the clamp force is low or zero. The nut may be restricted from rotating about the axis due to the nut being keyed to a portion of the nut ramp plate and the nut ramp plate being preloaded by a spring (e.g., FIG. 2). The nut may rotate about the longitudinal axis after a predetermined clamp force has been created (e.g., after the torque on the spindle is greater than the reacting torque of the clutch and the piston pocket, or the torque on the spindle is greater than the preload acting on the nut ramp plate).

Clutch on nut. The nut may include a clutch that restricts or prevents the nut from rotating about its axis when the spindle is rotated by the MGU during zero or low clamp force. The clutch may frictionally engage the piston pocket, the cylindrical pocket wall of the piston pocket, a projection on the piston pocket, or a combination thereof so that the nut is restricted from rotating while the nut is moved axially along a brake piston axis to create or release the clamp force. The clutch may comprise rubber. The clutch may be elastic, deformable, moldable, deflectable, resilient, or a combination thereof. The clutch may slip when the clamp force is a sufficient level, which may cause the nut to rotate about its axis with rotation of the spindle. The clutch may slip when the torque acting on the spindle is greater than the torque of the clutch acting on the piston pocket, the projections, or both. Rotation of the nut about its axis may function to engage and/or cause the nut ramp plate to rotate so that the ball ramp assembly expands to create the clamp force.

Ball ramp assembly. The parking brake system may include a ball ramp assembly. The ball ramp assembly may function to create, increase, decrease and/or withdraw the clamp force. The ball ramp assembly may function to move the brake piston against the brake pad and/or move the brake pad against the brake rotor to create and/or increase the clamp force. The ball ramp assembly may function to move the brake piston so that the brake pad moves away the brake rotor to reduce and/or eliminate the clamp force. The ball ramp assembly may include a rotating side and a stationary or non-rotating side with rolling elements or balls interposed there between. A torque input (rotation of the spindle, the nut, or both via the MGU, for example) may cause the rotating side to rotate, which may cause the rolling elements to engage and move along corresponding ramps between the rotating side and stationary side. The ball ramp assembly may include a piston ramp plate and a nut ramp plate. The piston ramp plate may be the stationary or non-rotating side, and the nut ramp plate may be the rotating side.

Piston ramp plate. The piston ramp plate may be located at or near a bottom wall of the piston pocket. The piston ramp plate may be connected to the bottom wall and may be permitted or restricted from rotating about the longitudinal axis. The piston ramp plate may be located near the bottom wall and permitted to axially move along the piston bore axis. A gap may exist or may be defined between the bottom wall and the piston ramp plate that must be taken up or eliminated before the brake piston can be moved to increase and/or create the clamp force. The piston ramp plate may be integrally formed with the bottom pocket wall. In other words, the one or more feature and/or functions of the piston ramp plate may be incorporated into and/or formed in the bottom wall of the piston. The piston ramp plate may be the stationary or non-rotating side, and the nut ramp plate may be the rotating side, or vice versa.

The piston ramp plate may include a clutch. The clutch of the piston ramp plate may function to restrict or prevent rotation of the piston ramp plate, to facilitate assembly into the piston, or both. In other words, the clutch may function to facilitate assembly of the ball ramp assembly in the piston pocket and prevent the ball ramp assembly from falling out of the piston once installed therein. The clutch may be the same or at least similar to the clutch on the nut described above. The clutch on the piston ramp plate may frictionally engage the piston pocket, the one or more walls of the piston pocket, one or more projections, or a combination thereof. The piston ramp plate may be restricted or prevented from rotating within the piston pocket by virtue of its engagement with the bottom and/or engagement of the clutch with the cylindrical walls of the piston pocket.

Nut ramp plate. In some instances, the nut and the nut ramp plate may be keyed so that the nut and the nut ramp plate are restricted or prevented from independently rotating. For example, the nut and the nut ramp plate may include mating ribs and slots that cooperate to prevent independent rotation of the nut and the nut ramp plate. In other instances, the nut and the nut ramp plate are not keyed and can thus be rotated independently of one another. A gap may exist or may be defined between the nut and the nut ramp plate that must be taken up before the nut axially moves the nut ramp plate before the clamp force can be increased or created. The nut ramp plate may be rotated when a pressing force is applied on the nut ramp plate via the nut. Rotation of the nut ramp plate may cause the one or more rolling elements of the ball ramp assembly to move so that the piston ramp plate moves away from the nut ramp plate, thus moving the brake piston and the brake pad against the brake rotor thus creating and/or increasing the clamp force.

The nut ramp plate may include a pocket. The pocket of the nut ramp plate may function to receive a spring. The pocket of the nut ramp plate may function to cooperate with the spring retainer to maintain a spring in compression there between. The pocket of the nut ramp plate may include a notch or a groove configured to engage an end of the spring.

Spring retainer. The ball ramp assembly may include a spring retainer. The spring retainer may function to maintain together the nut ramp plate, the piston ramp plate and the interposed balls or rolling elements located between the piston ramp plate and the nut ramp plate. The spring retainer may cooperate with the nut ramp plate to compress a spring there between. The spring retainer may include fingers that engage the piston ramp plate. The spring retainer may include a flange that may cooperate with the pocket in the nut ramp plate to compress the spring. The spring may be maintained in compression between the nut ramp plate and the spring retainer during creation of the clamping force, release of the clamp force, or both. The spring may be maintained with a torsional preload to ensure the nut ramp plate is fully retracted to a home position (i.e., at the bottom of pocket of the nut ramp plate). The torsion load may be maintained via the grooves in a flange of the spring retainer and the grooves in the piston ramp plate that are engaged by the spring retainer fingers.

Ramps. Each of the nut ramp plate and the piston ramp plate may include one or more ramps. At least one ramp may be located on the nut ramp plate that corresponds with at least one ramp located on the piston ramp plate. The ramps on each of the ramp plates may generally oppose one another. Each of the ramps may include a deep end and a shallow end. When the clamp force is low or non-existent, (e.g., during steady state; when the parking brake is not applied; during a free running condition of the vehicle, etc.), a ball or rolling element may be located in the deep end of the opposing ramps so that the ball ramp mechanism is in a fully retracted position. The clamp force is created or increased as the nut ramp plate is rotated about the axis, which causes the rolling element to move from the deep end to the shallow end, which results in separation of the ramp plates, which causes an axial force to be exerted on the brake piston so that the brake piston is axially moved, which moves the brake pad against the brake rotor. Separation of the ramp plates may include axial movement of the piston ramp plate away from the nut ramp plate. A lock in the MGU may prevent back driving or release of the clamp force after the plates are separated and after the MGU is turned OFF.

The rolling element may be moved from the shallow end to the deep end when the clamp force is desired to be reduced or eliminated. Via the force applied on the nut ramp plate by the nut, the nut ramp plate may be rotated about the longitudinal axis to move the rolling element from the shallow end to the deep end. The nut ramp plate may be moved axially towards the piston ramp plate when the clamp force is reduced or eliminated. A biasing member such as a spring may function to move the nut ramp plate towards the piston ramp plate when the rolling element is moved from the shallow end to the deep end in order to bring the plates together to a position where the clamp force is low or non-existent.

Ramp portions. The one or more ramps may include a variable lead comprising one or more ramp portions, which may be one or more areas or locations on a ramp that are inclined, or generally flat. The one or more ramp portions referred to herein may be located in a deep part of a ramp or at a shallow part of the ramp. For example, the one or more ramps may include one or more ramp portions having a first slope, one or more portions with a second slope, one or more portions with a third slope, one or more ramp portions having a fourth slope, and so on. The one or more ramps may include any number of ramp portions that can be accurately produced during a manufacturing process. The slopes of these ramp portions may be the same as the slopes of other ramp portions; larger than one or more other slopes of other ramp portions; smaller than one or more slopes of other ramp portions, or a combination thereof. A ramp portion having a smaller slope may require less torque from the MGU to move the rolling element up that ramp portion, which may be desired as the clamp force is increased. A ramp portion having a larger slope may require more torque from the MGU to move the rolling element up that ramp portion, which may be desired when the clamp force is initially generated. A ramp portion may have a slope that is generally zero. A ramp portion having a slope that is flat or generally zero may function to provide a self-lock function. In this regard, when a rolling element is located in a corresponding ramp portion having a zero or flat slope, if the MGU is turned OFF, the clamp for will be maintained, and a lock or brake in the MGU is unnecessary. In other words, the ball ramp assembly, the rotary to linear stage mechanism, or both will not back drive and undesirably release the clamp force. Such zero or flat sloped ramp portions may be located amongst other ramp portions having various slopes. The lengths of each of the ramp portions may be the same, or the lengths may vary. For example, a length of a first ramp portion may be longer, shorter, or the same as a second ramp portion and/or a third ramp portion, or any combination thereof.

Spring. The ball ramp assembly may include one or more biasing elements or springs. The spring may be a coil spring. The spring may function to apply a pre-load on the ball ramp assembly to restrict or prevent rotational movement of at least one of the plates. For example, the spring may function to prevent rotational movement of the nut ramp plate when the nut applies a pushing force on the nut ramp plate during application of the parking brake assembly and/or while the clamp force is being developed. The spring may allow for the nut ramp plate to at least partially rotate in order to generate and/or increase the clamp force as the torque applied to the spindle via the MGU increases. The spring may function to axially move the nut ramp plate towards the piston ramp plate to a steady state position when the clamp force is reduced or eliminated. When the piston ramp plate is connected to or integrally formed with the brake piston, the spring may function to move the nut ramp plate towards the brake piston when the clamp force is reduced or eliminated. The spring may be maintained in tension during the creation of the clamping force, increase in the clamp force, the release of the clamp force, or a combination thereof. The spring may be maintained in compression during the creation of the clamping force, increase in the clamp force, the release of the clamp force, or a combination thereof.

The spring may be connected or attached to a one or more grooves, cutouts, or notches in the nut ramp plate, the piston ramp plate, the spring retainer, the stopper, or a combination thereof. Accordingly, the ball ramp assembly can be assembled into the brake piston as a unit. The spring may function to maintain the nut ramp plate and the piston ramp plate in a steady state position relative to one another when the clamp force is not being applied. The spring may function to move the nut ramp plate back towards the piston ramp plate in order to reduce or eliminate the clamp force. The spring may be connected to a stopper that is fixed to an inner portion (e.g., piston pocket) of the brake piston.

Controller. The parking brake system may include one or more controllers. The controller may function to turn the motor, the motor gear unit, or both ON and OFF. The controller may function to receive a signal to apply a parking brake, release a parking brake or both. When the controller receives a signal to apply or turn ON a parking brake, the controller may function to turn ON the motor, the motor gear unit, or both to generate power. The controller may function to monitor the clamp force as it is being created, and may function to turn OFF the motor, the motor gear unit, or both after a suitable clamp force or load has been created and/or detected. When the controller receives a signal to release the parking brake, the controller may function to turn ON the motor, the motor gear unit, or both to generate power to release the clamp force. The signal to the controller may be provided by a suitable means, such as pushing a button, pulling a lever or cable. The signal may be provided automatically when a vehicle is placed in a parking gear, for example. The controller may be in communication with the parking brake assembly, the motor, the motor gear unit, or a combination thereof to control one or more functions thereof. The controller may communicate with the parking brake assembly, the motor, the motor gear unit, or a combination thereof by wire or wirelessly.

Assembly. One or more of the brake piston assemblies shown and described herein may be assembled with a method. The method may include one or more of the steps discussed in this disclosure. It is understood that one or more of these steps may be omitted, combined with one or more other steps, or duplicated. The one or more brake piston assemblies may be preassembled before being installed into the brake caliper or into a corresponding caliper bore of the brake caliper. For example, a brake piston assembly may be preassembled by inserting a ball ramp assembly into a piston pocket of a corresponding brake piston. In some configurations (i.e., FIGS. 6-8), the ball ramp assembly may be pre-assembled and held together with a spring retainer before being inserted into a piston pocket of the brake piston. In other configurations (i.e., FIGS. 3-5b), the ball ramp assembly may be pre-assembled and held together with a spring that engages both the nut ramp plate and the piston ramp plate before being inserted into a piston pocket of the brake piston.

The preassembled ball ramp assembly can be inserted into the piston pocket such that the piston ramp plate is located near or in contact with the bottom wall of the piston pocket. The piston ramp plate may include a clutch that functions to engage the inner wall or projections of the piston pocket and thus maintains a position of the ball ramp assembly in the piston pocket. The clutch may sufficiently engage the inner wall or projections so that axial movement of the piston ramp plate and the ball ramp assembly is restricted or prevented. The clutch may sufficiently engage the inner wall or projections so that the ball ramp assembly is prevented from falling out of the piston pocket if the brake piston is turned upside down. The clutch may have a sufficient rigidity and/or may engage the inner wall and/or projections so as to resist deformation when a force is applied on the piston ramp plate and thus prevent the piston ramp plate from moving.

The rotary to linear stage mechanism may be connected to the ball ramp assembly. The rotary to linear stage mechanism can be connected to the ball ramp assembly before or after the ball ramp assembly is installed the piston pocket. The rotary to linear stage mechanism can also be preassembled, meaning the spindle and the nut are threadably engaged before being installed in the piston pocket and/or connected to the ball ramp assembly. The nut may be preassembled on the spindle such that the nut contacts a flange of the spindle. Alternatively, the nut may threadably engage any position of the spindle. The thrust bearing may be installed against a surface of the flange of the spindle that is opposite the surface the nut may engage in a preassembled condition. The preassembled spindle, nut, and thrust bearing may be installed in the caliper bore and secured to the caliper body. The brake piston may then be installed in the caliper bore after the spindle, nut, and thrust bearing are secured to the caliper body. The brake piston may then be installed in the caliper bore such that the clutch on the nut engages the inner wall and/or projections on the piston pocket to resist rotation and/or movement thereof during assembly. Alternatively, the spindle and nut may be first installed in the piston pocket before the spindle and nut are installed in the caliper bore. That is, the ball ramp assembly, the spindle, the nut, and the thrust bearing may be all assembled in the brake piston, and then the preassembled brake piston assembly comprising the ball ramp assembly and the rotary to linear stage mechanism may then be inserted into a corresponding caliper bore in the brake caliper. Because the nut is not keyed to the inner wall of the piston pocket, assembly of the rotary to linear stage mechanism may be improved because the nut and/or the rotary to linear stage mechanism does not need to be clocked and/or rotationally aligned with corresponding features in the piston pocket. It is also within the scope of this disclosure to preassemble the ball ramp assembly and the rotary to linear stage mechanism and then install both the ball ramp assembly and the rotary to linear stage mechanism as a single unit into the piston pocket of the brake piston. In some configurations, such as those shown in FIG. 2, the piston ramp plate may be installed in the piston pocket, followed by the rolling elements, nut ramp plate, spring, and the stopper. These elements may be inserted into the piston pocket individually, or together at once. The stopper may function to engage the ball ramp assembly against the side wall of the piston pocket by engaging a groove in the piston pocket and thus maintain the ball ramp assembly in the brake piston. The nut, which may be keyed to the nut ramp plate, may be rotationally aligned and fit into the keyed portion of the nut ramp plate. The spindle may be threadably engaged with the nut before the nut is fit into the keyed portion of the nut ramp plate, or the spindle may be threaded into the nut after the nut engages the keyed portion. The assembled brake piston may then be inserted into a caliper bore.

FIG. 1 illustrates a brake system 100. The brake system 100 includes a brake caliper 102 and a motor gear unit 104. The brake caliper 102 includes a caliper bore 106 supporting a brake piston assembly 10. The brake caliper 102 includes an inboard brake pad 108 and an outboard brake pad 110. A brake rotor is located between the brake pads 108, 110. The brake caliper 102 includes fingers 112 in contact with the pressure plate of the outboard brake pad 110. The brake pads 108 and 110 are prevented from rotation about the wheel axis by the support bracket 116.

Figure 2:
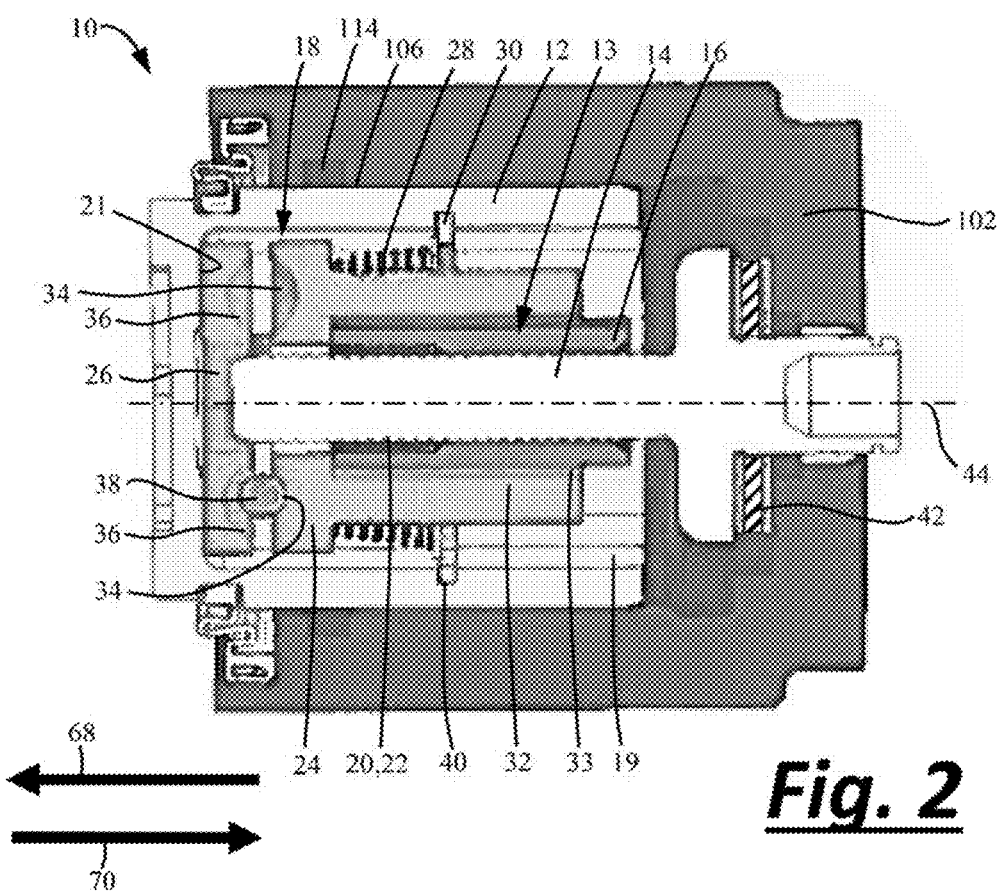
FIG. 2 is a cross section of a brake piston.

FIG. 2 illustrates a brake piston assembly 10. The brake piston assembly 10 includes a brake piston 12; a rotary to linear stage mechanism 13 comprising a spindle 14 and a nut 16; and a ball ramp assembly 18. The spindle 14 includes threads 20 that threadably engage mating threads 22 on the nut 16. A piston seal 114 is located between the caliper bore 106 of the brake caliper 102 and an outer surface of the brake piston 12.

With continued reference to FIG. 2, the brake piston 12 includes a piston pocket 19. The ball ramp assembly 18 is located in the piston pocket 19. The ball ramp assembly 18 includes a nut ramp plate 24, a piston ramp plate 26, a spring 28, and a stopper 30. The nut ramp plate 24 includes a cylindrical feature 32 that includes an inner portion 33. The inner portion 33 is keyed to the nut 16 so that the nut ramp plate 24 and the nut 16 are restricted from rotating independently of one another. The nut ramp plate 24 includes one or more ramps 34, and the piston ramp plate 26 includes one or more corresponding ramps 36. The piston ramp plate 26 is located against a bottom wall 21 of the piston pocket 19. A rolling element 38 is located between each of the corresponding ramps 34, 36. The stopper 30 is fixed in a notch 40 defined in the piston pocket 19. The spring 28 is compressed between the stopper and the ramp nut plate 24 so that a pre-load is applied on the nut ramp plate 24. The spring 28 is in compression even when the parking brake is not applied (e.g., during a free running condition of the vehicle). A bearing 42 is located between the spindle 14 and the brake caliper 102.

With reference to both FIGS. 1 and 2, when the parking brake is applied, the motor gear unit 104 generates power, which causes the spindle 14 to rotate in an apply direction about its axis 44. Rotation of the spindle 14 in the apply direction causes the nut 16 to axially advance along the axis 44 in direction 68. The nut 16 is restricted from rotating about the axis 44 due to it being keyed with the inner portion 33 of the nut ramp plate 24. The nut ramp plate 24 is restricted from rotating about the axis 44 due to the pre-set load acting on it via the compressed and torsionally pre-loaded spring 28. As the spindle 14 is rotated, the nut 16 advances in direction 68 until the nut 16 contacts the nut ramp plate 24. After contact is made, continued rotation of the spindle 14 causes the nut 16 to apply an axial load on the nut ramp plate 24 causing the ball ramp assembly 18 to move in direction 68, and, as such, the brake piston 12 is also moved in direction 68 until the brake piston 12 contacts the inboard brake pad 108. After contact is made, continued rotation of the spindle 14 causes the brake piston 12 to move the inboard brake pad 108 against the brake rotor to begin developing the clamp force.

Due to friction between the threads 20, 22 of the spindle 14 and nut 16, continued rotation of the spindle 14, and therefore the continued application of force on the nut ramp plate 24 by the nut 16, causes the pre-set load on the nut ramp plate 24 by the spring 28 to be overcome so that the nut ramp plate 24 begins rotating. Rotation of the nut ramp plate 24 causes the rolling elements 38 to move up the corresponding ramps 34, 36 (i.e., up from a deep end of a ramp to a shallow end of the ramp), which causes the piston ramp plate 26 to move in direction 68 away from the nut ramp plate 24. Movement of the piston ramp plate 26 in direction 68 correspondingly moves the brake piston 12 in direction 68 so that the inboard brake pad 108 is moved further against the brake rotor to create the clamp force.

With continued reference to FIGS. 1 and 2, when the parking brake is released, the motor gear unit 104 rotates the spindle 14 in a release direction, which causes the nut 16 and the nut ramp plate 24 to rotate about the axis 44 in a release direction. The nut ramp plate 24 is allowed to rotate back so that the rolling elements 38 move down the corresponding ramps 34, 36 (i.e., from the shallow end to the deep end). Thereafter, further rotation of the spindle 14 causes the nut 16 to move along the axis 44 in direction 70 so that the brake piston 12 moves away from the inboard brake pad 108 and the inboard brake pad 108 moves away from the brake rotor thus releasing the clamp force.

Figure 3:
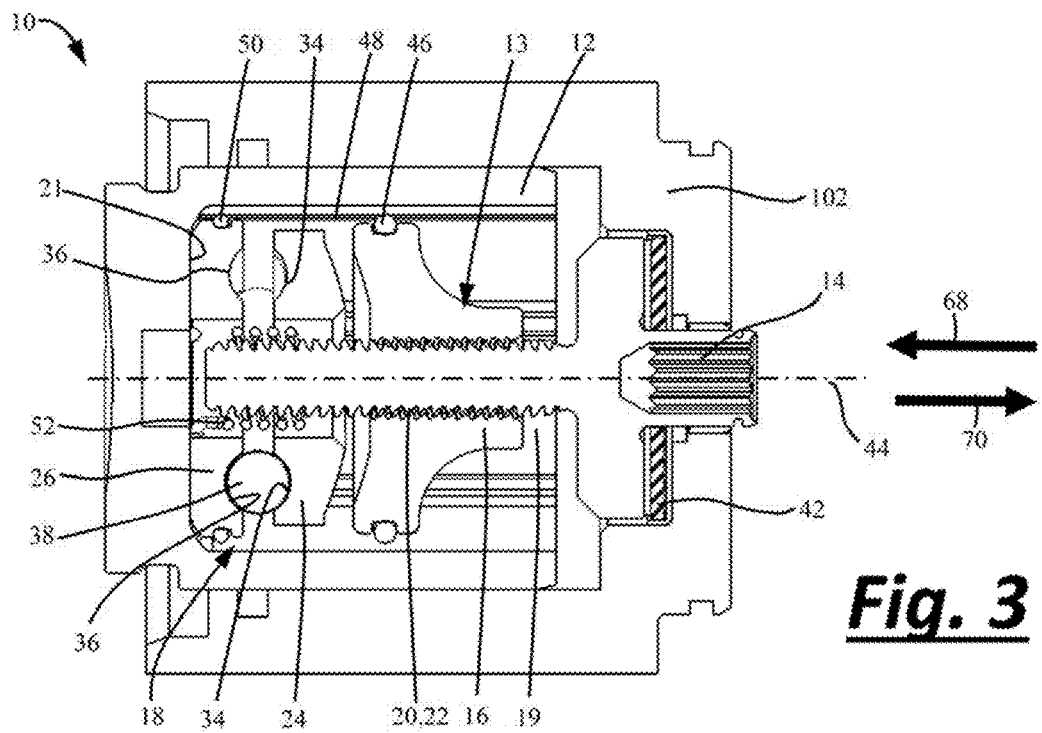
FIG. 3 is a cross section of a brake piston.

FIG. 3 illustrates a brake piston assembly 10. The brake piston assembly 10 includes a brake piston 12; a rotary to linear stage mechanism 13 comprising a spindle 14 and a nut 16; and a ball ramp assembly 18. The spindle 14 includes threads 20 that threadably engage mating threads 22 on the nut 16.

With continued reference to FIG. 3, the brake piston 12 includes a piston pocket 19. The ball ramp assembly 18 is located in the piston pocket 19. The nut 16 includes a clutch 46 that engages an inner surface 48 of the piston pocket 19. The ball ramp assembly 18 includes a nut ramp plate 24, a piston ramp plate 26, and a spring 52. The nut ramp plate 24 includes one or more ramps 34, and the piston ramp plate 26 includes one or more corresponding ramps 36. The piston ramp plate 26 is located at a bottom wall 21 of the piston pocket 19. A rolling element 38 is located between the corresponding ramps 34, 36. The piston ramp plate 26 includes a clutch 50 that engages the inner surface 48 of the piston pocket 19. The spring 52 is secured to both the nut ramp plate 24 (See FIG. 4A) and the piston ramp plate 26 (See FIG. 5a). The rolling elements 38 that are located between the corresponding ramps 34, 36 separate the ramp plates 24, 26 such that the spring 52 is maintained in tension. A bearing 42 is located between the spindle 14 and the brake caliper 102.

Figure 4A:
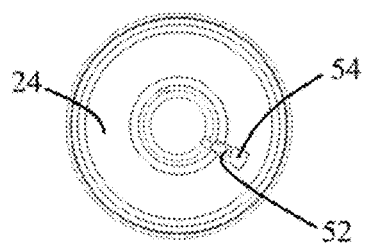
FIG. 4a is a bottom view of a nut ramp plate of FIG. 3.

FIG. 4a is a top view of the nut ramp plate 24 of FIG. 3. The nut ramp plate 24 includes a recess 54 that is engaged by the spring 46.

Figure 4B:
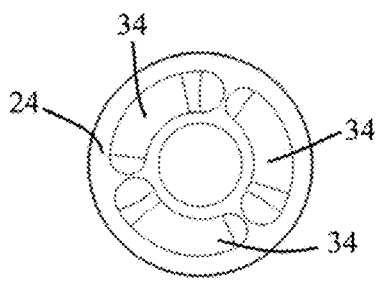
FIG. 4b is a top view of a nut ramp plate of FIG. 3.

FIG. 4b is a bottom view of the nut ramp plate 24 of FIG. 3. The nut ramp plate 24 includes a plurality of ramps 34 that correspond with ramps 36 in the piston ramp plate 26 (See FIG. 5b).

Figure 5A:
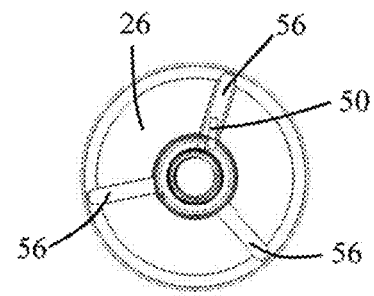
FIG. 5a is a top view of a piston ramp plate of FIG. 3.

FIG. 5a is a bottom view of the piston ramp plate 26 of FIG. 3. The piston ramp plate 26 includes a plurality of recesses 56. A portion of the spring 52 engages one of the recesses 56.

Figure 5B:
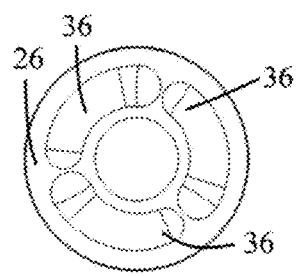
FIG. 5b is a bottom view of a piston ramp plate of FIG. 3.

FIG. 5b is a top view of the piston ramp plate 26 of FIG. 3. The piston ramp plate 26 includes a plurality of ramps 36 that correspond with ramps 34 in the nut ramp plate 24 (See FIG. 4b).

Referring to FIGS. 3-5b, when the parking brake is applied, the motor gear unit 104 generates power, which causes the spindle 14 to rotate in an apply direction about its axis 44. Rotation of the spindle 14 in the apply direction causes the nut 16 to axially advance along the axis 44 in direction 68. The nut 16 is restricted from rotating about the axis 44 when spindle 14 is rotated due to the clutch 46 engaging the inner surface 48 of the piston pocket 19. The nut 16 is advanced along the axis 44 in direction 68 until the nut 16 contacts the nut ramp plate 24. After contact is made, continued rotation of the spindle 14 causes the nut 16 to move the ball ramp assembly 18 in direction 68, and, as such, the brake piston 12 is also moved in direction 68 until the brake piston 12 contacts the inboard brake pad 108. After contact is made, continued rotation of the spindle 14 causes the brake piston 12 to move the inboard brake pad 108 against the brake rotor to begin developing the clamp force.

Due to friction between the threads 20, 22 of the spindle 14 and nut 16, continued rotation of the spindle 14 causes the clutch 46 that is engaged against the inner surface 48 of the piston pocket 19 to slip so that the nut 16 can rotate with the spindle 14. With the nut 16 engaged against the nut ramp plate 24, rotation of the nut 16 causes the nut ramp plate 24 to also rotate. The piston nut plate 26 is restricted from rotating due to the clutch 50 engaged against the inner surface 48 of the piston pocket 19. Rotation of the nut ramp plate 24 causes the rolling elements 38 to move up the corresponding ramps 34, 36, from a deep end to a shallow end, so that the piston ramp plate 26 axially moves in direction 68 away from the nut ramp plate 24. Axial movement of the piston ramp plate 26 in direction 68 correspondingly moves the brake piston 12 in direction 68 so that the inboard brake pad 108 is moved further against the brake rotor to create the clamp force.

With continued reference to FIGS. 3-5b, when the parking brake is released, the motor gear unit 104 rotates the spindle 14 about the axis 44 in a release direction, which causes the nut 16 and the nut ramp plate 24 to rotate in a release direction. The tension on the spring 52 is reduced, allowing the spring 52 to contract, which causes the rolling elements 38 to move down the corresponding ramps 34, 36 from the shallow end to the deep end so that the piston ramp plate 26 moves in direction 70 towards the nut ramp plate 24. Thereafter, further rotation of the spindle 14 causes the nut 16 to move in direction 70 away the piston ramp plate 26 so that the brake piston 12 moves away from the inboard brake pad 108 and the inboard brake pad 108 moves away from the brake rotor thus releasing the clamp force.

Figure 6:
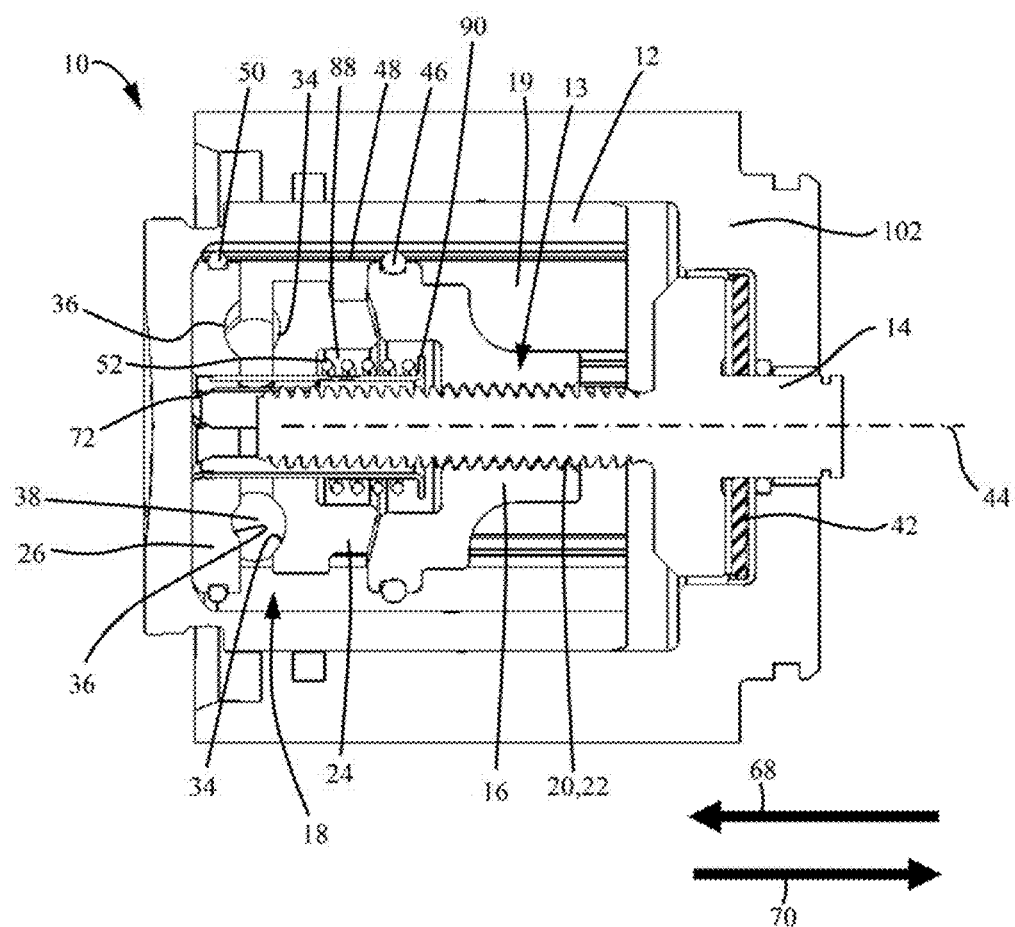
FIG. 6 is a cross section of a brake piston.

FIG. 6 illustrates a brake piston assembly 10. The brake piston assembly 10 includes a brake piston 12; a rotary to linear stage mechanism 13 comprising a spindle 14 and a nut 16; and a ball ramp assembly 18. The spindle 14 includes threads 20 that engage mating threads 22 on the nut 16. The brake piston 12 includes a piston pocket 19. The ball ramp assembly 18 is located in the piston pocket 19. The nut 16 includes a clutch 46 that engages an inner surface 48 of the piston pocket 19.

Figure 7:
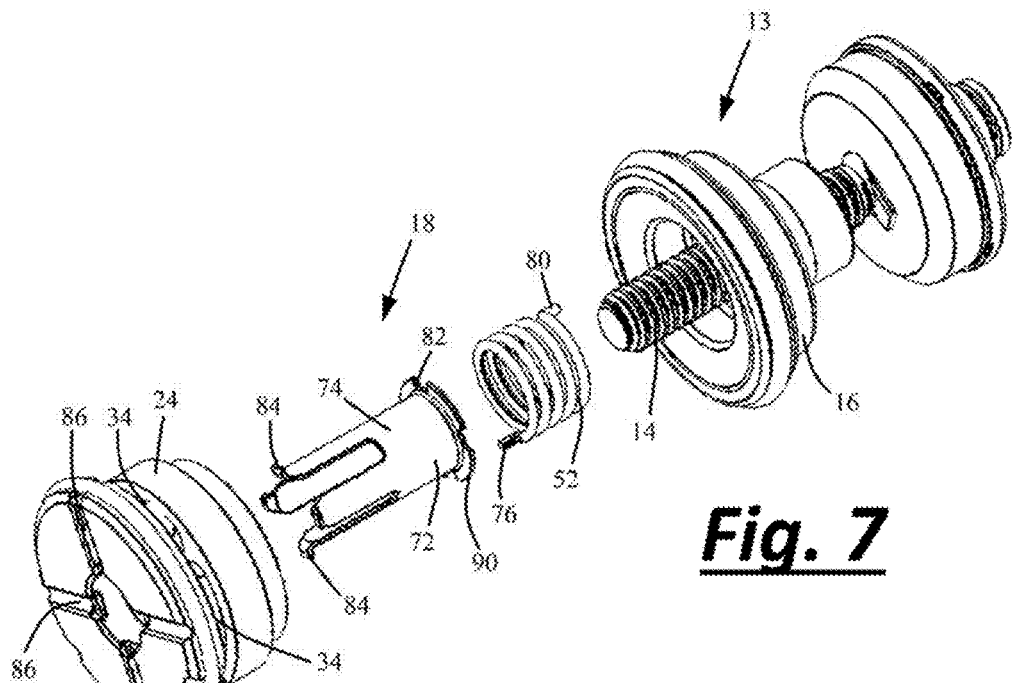
FIG. 7 is a partial exploded perspective view of FIG. 6.
Figure 8:
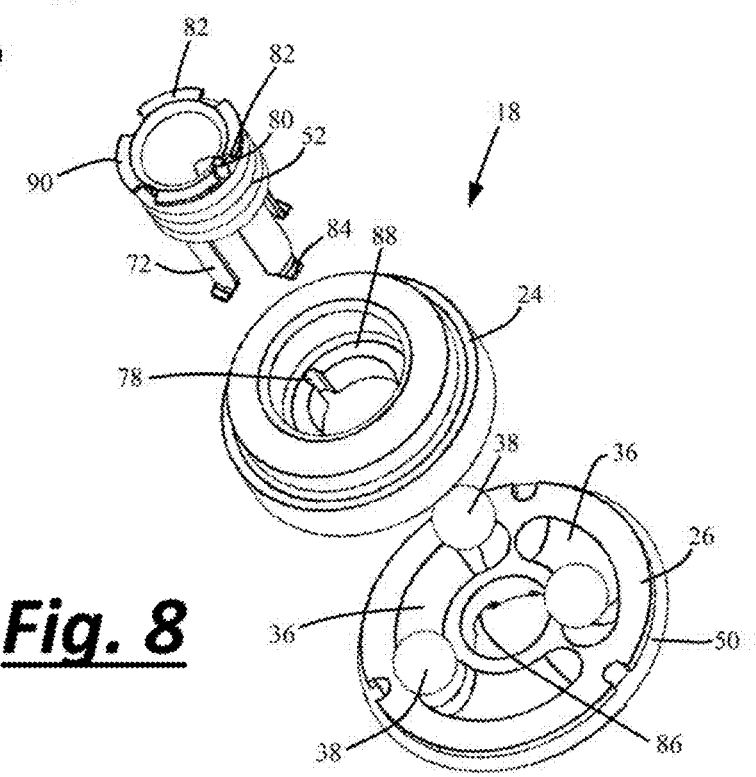
FIG. 8 is a partial exploded perspective view of FIG. 6.

With additional reference to FIGS. 7-8, the ball ramp assembly 18 includes a nut ramp plate 24, a piston ramp plate 26, a spring 52, and a spring retainer 72. The piston ramp plate 26 includes a clutch 50 that engages the inner surface 48 of the piston pocket 19. The nut ramp plate 24 includes one or more ramps 34, and the piston ramp plate 26 includes one or more corresponding ramps 36. A rolling element 38 is located between corresponding ramps 34, 36.

The spring 52 is received on the body 74 of the spring retainer 72. The spring retainer 72 includes fingers 84 that engage corresponding grooves 86 in the piston ramp plate 26. A first end 76 of the spring 52 (FIG. 7) is received in a notch 78 in the nut ramp plate 24 (FIG. 8), and a second end 80 of the spring 52 (FIG. 7) is received in a notch 82 in the spring retainer 72 (FIGS. 7 and 8). The rolling elements separate the corresponding ramps 34, 36 so that the spring 52 is maintained in compression between a pocket 88 in the nut ramp plate 24 and a flange 90 on the spring retainer 72 (FIG. 6). A bearing 42 is located between the spindle 14 and the brake caliper 102.

Referring to FIGS. 1 and 6-8, when the parking brake is applied, the motor gear unit 104 generates power, which causes the spindle 14 to rotate in an apply direction about its axis 44. Rotation of the spindle 14 in the apply direction causes the nut 16 to axially advance along the axis 44 in direction 68. The nut 16 is restricted from rotating about the axis 44 when spindle 14 is rotated due to the clutch 46 engaging the inner surface 48 of the piston pocket 19. The nut 16 is advanced along the axis 44 in direction 68 until the nut 16 contacts the nut ramp plate 24. After contact is made, continued rotation of the spindle 14 causes the nut 16 to move the ball ramp assembly 18 in direction 68, and, as such, the brake piston 12 is also moved in direction 68 until the brake piston 12 contacts the inboard brake pad 108. After contact is made, continued rotation of the spindle 14 causes the brake piston 12 to move the inboard brake pad 108 against the brake rotor to begin developing the clamp force.

With continued reference to FIGS. 6-8, due to friction between the threads 20, 22 of the spindle 14 and nut 16, continued rotation of the spindle 14 causes the clutch 46 engaged against the inner surface 48 of the piston pocket 19 to slip so that the nut 16 rotates with the spindle 14. With the nut 16 engaged against the nut ramp plate 24, rotation of the nut 16 causes the nut ramp plate 24 to also rotate. The piston nut plate 26 is restricted from rotating due to the clutch 50 engaged against the inner surface 48. Rotation of the nut ramp plate 24 causes the rolling elements 38 to move up the corresponding ramps 34, 36, from a deep end to a shallow end, so that the piston ramp plate 26 axially moves in direction 68 away from the nut ramp plate 24. Axial movement of the piston ramp plate 26 in direction 68 correspondingly pulls the spring retainer 52 in direction 68 (via the engagement of the fingers 84 in the grooves 86) so that the spring 52 is further compressed between the flange 90 and the pocket 88. Axial movement of the piston ramp plate 26 in direction 68 also correspondingly moves the brake piston 12 in direction 68 so that the inboard brake pad 108 is moved further against the brake rotor to create the clamp force.

With continued reference to FIGS. 1 and 6-8, when the parking brake is released, the motor gear unit 104 rotates the spindle 14 about the axis 44 in a release direction, which causes the nut 16 and the nut ramp plate 24 to rotate in a release direction. The rolling elements 38 move down the corresponding ramps 34, 36, from the shallow end to the deep end, so that the piston ramp plate 26 moves in direction 70 towards the nut ramp plate 24 thus reducing the compression on the spring 52. Thereafter, further rotation of the spindle 14 causes the nut 16 to move in direction 70 away the piston ramp plate 26 so that the brake piston 12 moves away from the inboard brake pad 108 and the inboard brake pad 108 moves away from the brake rotor thus releasing the clamp force.

Figure 9:
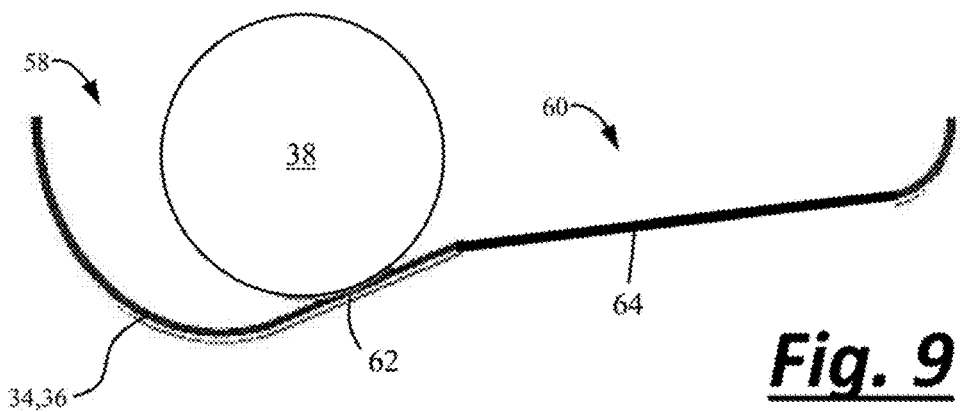
FIG. 9 is a cross section of a ramp.

FIG. 9 is a cross section of one or both of the ramps 34, 36. The ramp 34, 36 includes a deep end 58 and a shallow end 60. The ramp 34, 36 includes a variable lead having a first portion 62 and a second portion 64. The rolling element 38 is located at the deep end 58 at a start of the parking brake apply when the clamp force is low or non-existent and the torque input via the motor gear unit 104 is low. As the clamp force increases, the rolling element 38 moves from the deep end 58 to the shallow end 60, (e.g., from the first portion 62 onto the second portion 64), which causes the piston ramp plate 26 to move away from the nut ramp plate 24. Because the slope of the second portion 60 is less than the slope of the first portion 58, moving the rolling element 38 up the second portion 64 requires less torque input from the motor gear unit 104 compared to moving the ball 38 up the first portion 58. Accordingly, the clamp continues to increase as the rolling element 38 moves up the ramps 34, 36, while requiring less or the same amount of torque input from the motor gear unit 104.

Figure 10:
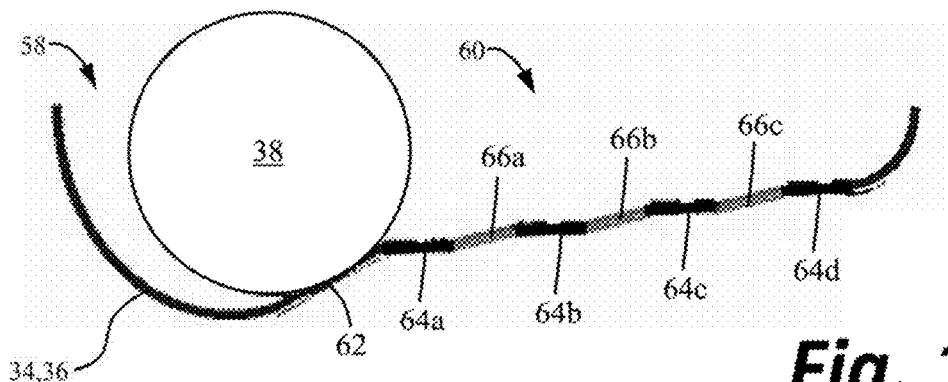
FIG. 10 is a cross section of a ramp.

FIG. 10 is a cross section of one or both of the ramps 34, 36. The ramp 34, 36 includes a deep end 58 and a shallow end 60. The ramp 34, 36 includes a variable lead comprising a first portion 62, a second section or portions 64a, 64b, 64c, and 64d, and third portions 66a, 66b, and 66c. A slope of the first portion 62 is greater than the slopes of each of the second and third portions 64a,b,c,d 66a,b,c. The slope of the third portions 66a,b,c is greater than the slope of the second portions 64a,b,c,d. The rolling element 38 is located at the deep end 58 at a start of the parking brake apply when the clamp force is low or non-existent and thus the torque input from the motor gear unit 104 is low. As the clamp force increases, the ball 38 moves up the ramp 34, 36 onto the shallow end 60, which causes the piston ramp plate 26 to move away from the nut ramp plate 24. Because the slope of the second portion 64a is less than the slope of the first portion 62, moving the rolling element 38 up the second portion 64a requires less torque input from the motor gear unit 104 compared to moving the rolling element 38 up the first portion 62. In fact, the slope of the second portion 64a may be substantially zero so that if the torque input (e.g., the motor gear unit 104) ceases to operate or is turned off, whatever clamp force has been developed when the rolling element 38 is located on the second portion 64a can be maintained. In other words, the ball ramp assembly is restricted from back driving and the rolling element 38 may remain on the second portion 64a.

As the clamp force continues to increase, the rolling element 38 moves up onto the third portion 66a, which causes the piston ramp plate 26 to axially move further away from the nut ramp plate 24. Because the slope of the third portion 66a is less than the slope of the first portion 62, moving the rolling element 38 up the third portion 66a requires less torque input from the motor gear unit 104 compared to moving the rolling element 38 up the first portion 62, but more torque compared to moving the rolling element 38 up the second portion 64a. As the clamp force continues to increase, the rolling element 38 then moves up onto the second portion 64b, which causes the piston ramp plate 26 to move further away from the nut ramp plate 24. Again, the slope of the second portion 64b may be substantially zero so that if the torque input ceases to operate or is turned off, whatever clamp force has been developed when the rolling element 38 is located on the second portion 64b can be maintained. The rolling element 38 may continue to move up the ramp 34, 36 (e.g., onto the third portion 66b, and onto subsequent second and third portions) until the clamp force is developed. The maximum clamp force may be developed when the rolling element 38 is located on the second portion 64d.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A brake piston assembly, comprising:
  a) a brake piston;
  b) a rotary to linear stage mechanism comprising a spindle and a nut; and
  c) a ball ramp assembly comprising a nut ramp plate and a piston ramp plate;
  wherein the brake piston comprises a piston pocket, the piston pocket comprises a bottom wall and a side wall, the ball ramp assembly is located adjacent the bottom wall of the piston pocket, and wherein the nut comprises a rubber clutch that is configured to engage the side wall of the piston pocket and restrict rotation of the nut about a longitudinal axis of the brake piston during rotation of the spindle and creation of a clamp force.

2. The brake piston assembly according to claim 1, wherein the rotation of the spindle causes the nut to axially move until the nut directly contacts the nut ramp plate, and further axial movement of the nut by way of the rotation of the spindle causes the nut to move the ball ramp assembly and the brake piston against an inboard brake pad to create the clamp force, and wherein the clamp force is created to apply a parking brake.

3. The brake piston assembly according to claim 1, wherein the ball ramp assembly comprises at least one rolling element that is located between the piston ramp plate and the nut ramp plate, wherein the engagement between the rubber clutch and the side wall of the piston pocket is configured to slip as the clamp force increases so that the nut begins to rotate with the rotation of the spindle about the longitudinal axis, which causes the nut ramp plate to also rotate about the longitudinal axis, which causes the at least one rolling element to axially separate the piston ramp plate from the nut ramp plate, and wherein the axial separation of the piston ramp plate from the nut ramp plate causes the brake piston to move an inboard brake pad to increase the clamp force.

4. The brake piston assembly according to claim 1, wherein the ball ramp assembly comprises a spring, the spring is adapted to maintain a load on the ball ramp assembly, and wherein the spring is fixed to both the nut ramp plate and the piston ramp plate.

5. The brake piston assembly according to claim 1, wherein the ball ramp assembly comprises a spring retainer and a spring, wherein the spring is adapted to maintain a compressive load on the ball ramp assembly, and wherein the spring retainer is fixed to the nut ramp plate and a flange on the spring retainer.

6. The brake piston assembly according to claim 1, wherein the nut is keyed to an inner portion of the nut ramp plate so that the nut and the nut ramp plate are free from rotating independently of one another, wherein the ball ramp assembly comprises a stopper, the stopper is adapted to engage a groove in the side wall of the piston pocket, wherein the ball ramp assembly includes a spring, the spring is fixed between the stopper and the nut ramp plate, and wherein the spring is adapted to maintain a preload on the ball ramp assembly, which restricts rotation of the nut and the nut ramp plate during the rotation of the spindle.

7. The brake piston assembly according to claim 1, wherein the nut ramp plate and the piston ramp plate comprise at least one set of corresponding ramps, wherein each of the corresponding ramps comprise a first portion and a second portion, wherein as the clamp force increases, the nut ramp plate rotates about an axis which causes a rolling element to move up the corresponding ramps from the first portion to the second portion, which causes the nut ramp plate and the piston ramp plate to axially separate, wherein a slope of the first portion is greater than a slope the second portion.

8. The brake piston assembly according to claim 7, wherein each of the corresponding ramps comprise a third portion, wherein as the clamp force increases, the nut ramp plate rotates about the axis which causes the rolling element to move up the corresponding ramps from the first portion to the second portion and then from the second portion to the third portion so that the nut ramp plate and the piston ramp plate further axially separate.

9. The brake piston assembly according to claim 8, wherein the slope of the first portion is greater than the slope the second portion and also greater than a slope of the third portion.

10. The brake piston assembly according to claim 1, wherein the ball ramp assembly comprises a rubber clutch that is adapted to engage the side wall of the piston pocket.

11. A brake system comprising:
a brake caliper comprising:
a) the brake piston assembly according to claim 1, the brake piston assembly is located in a caliper bore of the brake caliper, and
b) a motor gear unit, the motor gear unit is in communication with the spindle;
wherein the piston ramp plate comprises a rubber clutch that is adapted to engage the side wall of the piston pocket,
wherein the motor gear unit is adapted to rotate the spindle, which causes the nut to axially advance until the nut directly contacts the nut ramp plate, and further rotation of the spindle causes the nut to move the ball ramp assembly and the brake piston against an inboard brake pad and the inboard brake pad against a brake rotor to create the clamp force.

12. The brake system according to claim 11, wherein the nut ramp plate and the piston ramp plate comprise at least one set of corresponding ramps, wherein as the clamp force increases, the nut ramp plate rotates about an axis which causes a rolling element to move up the corresponding ramps so that the nut ramp plate and the piston ramp plate separate, wherein each of the ramps comprise a first portion and a second portion, and wherein a slope of the first portion is greater than a slope the second portion.

13. The brake system according to claim 12, wherein the second portion comprises a plurality of intermittent sections, and between each of the intermittent sections the corresponding ramps comprise a flat section, a slope of each of the flat sections is generally zero.

14. The brake system according to claim 13, wherein each of the ramps comprise four flat sections.

15. The brake system according to claim 11, wherein the ball ramp assembly comprises a spring, the spring is adapted to engage both the piston ramp plate and the nut ramp plate, and wherein the spring is in tension during creation of the clamp force.

16. The brake system according to claim 11, wherein the ball ramp assembly comprises a spring, the spring engages both the piston ramp plate and the nut ramp plate, and wherein the spring is in compression during creation of the clamp force.

17. A method of assembling a brake piston assembly, the method comprising steps of:
  a) inserting a ball ramp assembly into a piston pocket of a brake piston; and
  b) inserting a rotary to linear stage mechanism into the piston pocket so that a nut of the rotary to linear stage mechanism contacts the ball ramp assembly, the nut comprises a rubber clutch that is configured to engage a side wall of the piston pocket;
  wherein the ball ramp assembly comprises a piston ramp plate and a nut ramp plate, and after the step of a), a clutch of the piston ramp plate is adapted to engage the side wall of the piston pocket so that the ball ramp assembly is maintained in the piston pocket.

18. The method of claim 17, wherein the ball ramp assembly comprises a spring retainer that maintains together the nut ramp plate, the piston ramp plate and a plurality of rolling elements between the piston ramp plate and the nut ramp plate so that during the step of a) the nut ramp plate, the piston ramp plate, and the plurality of rolling elements are inserted into the brake piston as a single assembly, and
  wherein the step of b) occurs after the step of a).

19. The brake piston assembly according to claim 10, wherein the piston ramp plate comprises the rubber clutch, the piston ramp plate is located adjacent the bottom wall of the piston pocket.

20. The method according to claim 17, wherein the clutch of the piston ramp plate is a rubber clutch.

* * * * *